(12) United States Patent
Yang et al.

(10) Patent No.: US 10,903,921 B2
(45) Date of Patent: Jan. 26, 2021

(54) METHOD AND DEVICE FOR PROVIDING HETEROGENEOUS NETWORK-BASED BROADCAST SERVICE

(71) Applicant: Samsung Electronics Co., Ltd., Suwon-si (KR)

(72) Inventors: Hyun-Koo Yang, Seoul (KR); Sung-Hee Hwang, Suwon-si (KR); Young-Kwon Lim, Goyang-si (KR); Kyung-Mo Park, Seoul (KR); Sung-Oh Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 15/320,542

(22) PCT Filed: Jun. 19, 2015

(86) PCT No.: PCT/KR2015/006245
§ 371 (c)(1),
(2) Date: Dec. 20, 2016

(87) PCT Pub. No.: WO2015/194906
PCT Pub. Date: Dec. 23, 2015

(65) Prior Publication Data
US 2017/0163363 A1 Jun. 8, 2017

(30) Foreign Application Priority Data

Jun. 20, 2014 (KR) .................. 10-2014-0076090

(51) Int. Cl.
*H04H 20/65* (2008.01)
*H04H 20/33* (2008.01)
(Continued)

(52) U.S. Cl.
CPC ............ *H04H 20/65* (2013.01); *H04H 20/18* (2013.01); *H04H 20/33* (2013.01); *H04H 60/82* (2013.01);
(Continued)

(58) Field of Classification Search
None
See application file for complete search history.

(56) References Cited

U.S. PATENT DOCUMENTS 6,408,335 B1 * 6/2002 Schwaller ............... H04L 43/50
703/13
2004/0057446 A1 * 3/2004 Varsa ................. H04L 29/06027
370/412

(Continued)

FOREIGN PATENT DOCUMENTS

CN        1748394 A     3/2006
CN      103179656 A     6/2013
(Continued)

OTHER PUBLICATIONS

Chinese Office Action dated Oct. 31, 2018, issued in Chinese Application No. 201580033426.X.
(Continued)

*Primary Examiner* — Chi H Pham
*Assistant Examiner* — Raul Rivas
(74) *Attorney, Agent, or Firm* — Jefferson IP Law, LLP

(57) ABSTRACT

A method for providing a broadcast service, according to the present invention, comprises the steps of: if a broadcast service is provided by means of two or more networks, obtaining the maximum value among the fixed end-to-end delay of each network; and, on the basis of the maximum value, controlling an output point of a receiver which received packets of the broadcast service.

16 Claims, 11 Drawing Sheets

(51) Int. Cl.
    *H04H 60/82*       (2008.01)
    *H04N 21/462*      (2011.01)
    *H04H 20/18*       (2008.01)
    *H04L 1/00*        (2006.01)
    *H04N 21/63*           (2011.01)
    *H04N 21/235*          (2011.01)
    *H04N 21/43*           (2011.01)
    *H04H 20/24*           (2008.01)

(52) U.S. Cl.
    CPC ....... *H04L 1/0076* (2013.01); *H04N 21/4622* (2013.01); *H04H 20/24* (2013.01); *H04L 1/0045* (2013.01); *H04N 21/235* (2013.01); *H04N 21/4302* (2013.01); *H04N 21/63* (2013.01)

(56) References Cited

U.S. PATENT DOCUMENTS

| | | |
|---|---|---|
| 2004/0190453 A1 | 9/2004 | Rasanen et al. |
| 2009/0116420 A1* | 5/2009 | Jeong .................. H04B 7/2606 370/312 |
| 2010/0257280 A1 | 10/2010 | Stokking et al. |
| 2011/0044200 A1* | 2/2011 | Kulyk .................... G10L 25/69 370/252 |
| 2012/0230389 A1 | 9/2012 | Laurent et al. |
| 2013/0346566 A1 | 12/2013 | Kwon et al. |
| 2014/0098811 A1 | 4/2014 | Bouazizi et al. |
| 2014/0293951 A1 | 10/2014 | Sun et al. |

FOREIGN PATENT DOCUMENTS

| | | |
|---|---|---|
| JP | 11-41608 A | 2/1999 |
| JP | 2006-500797 A | 1/2006 |
| JP | 2014-75831 A | 4/2014 |
| JP | 2015-536592 A | 12/2015 |
| KR | 10-2006-0027502 A | 3/2006 |
| KR | 10-2012-0104496 A | 9/2012 |
| WO | 02/071760 A2 | 9/2002 |
| WO | 2012/128563 A2 | 9/2012 |
| WO | 2013/025035 A2 | 2/2013 |
| WO | 2014/058237 A1 | 4/2014 |

OTHER PUBLICATIONS

Japanese Office Action dated Feb. 5, 2019, issued in Japanese Application No. 2017-519436.

* cited by examiner

| Syntax | Values | No. fo bits | Mnemonic |
|---|---|---|---|
| HRBM (){ | | | |
|    message_id | | 16 | |
|    version | | 8 | |
|    length | | 16 | |
|    extension { | | | |
|       extension_fields_Byte | | | |
|    } | | | |
|    message_payload { | | | |
|    max_buffer_size | | 32 | |
|    fixed_end_to_end_delay | | 32 | |
|    max_transmission_delay | | 32 | |
|    } | | | |
| } | | | |

FIG.5

METHOD AND DEVICE FOR PROVIDING HETEROGENEOUS NETWORK-BASED BROADCAST SERVICE

PRIORITY

This application is a National Phase Entry of PCT International Application No. PCT/KR2015/006245, which was filed on Jun. 19, 2015, and claims a priority to Korean Patent Application No. 10-2014-0076090, which was filed on Jun. 20, 2014, the contents of which are incorporated herein by reference.

TECHNICAL FIELD

The present disclosure relates to a method and apparatus for providing a broadcast service transmitted through heterogeneous networks.

BACKGROUND ART

With high-speed wireless networks and Internet, a broadcast service in a broadcasting and communication converged environment has been popularized. In line with this, a converged contents consumption environment has been established in which there coexist terminals having various capabilities, such as smartphones, tablet personal computers (PCs), etc., as well as televisions (TVs), PCs, and so forth. In such an environment, contents such as video, music, games, data, etc. have been seamlessly consumed in real time depending on the various capabilities of the terminals. As a result, there is an increasing demand for a broadcast service based on various heterogeneous networks.

DETAILED DESCRIPTION OF THE INVENTION

Technical Problem

The present disclosure provides a method and apparatus for providing a broadcast service provided through heterogeneous networks.

The present disclosure also provides a method and apparatus for synchronizing packets transmitted through heterogeneous networks, based on different delay characteristics for the respective networks in transmission of packets of a single broadcast service provided through the heterogeneous networks.

Technical Solution

A method for providing a broadcast service according to an embodiment of the present disclosure includes obtaining a maximum value among fixed end-to-end delay values of at least two networks when the broadcast service is provided over the at least two networks and controlling output points in time of a receiver having received packets of the broadcast service, based on the maximum value.

A method for receiving a broadcast service according to an embodiment of the present disclosure includes receiving output point-in-time control information that is configured based on a maximum value among fixed end-to-end delay values of at least two networks when the broadcast service is provided over the at least two networks, determining whether there is a packet having an output point in time preceding an output point in time that is set based on the output point-in-time control information, upon receiving packets of the broadcast service over the networks, and if there is the packet having the output point in time preceding the set output point in time, waiting until the set output point in time and outputting the packet at the set output point in time.

A transmitter for providing a broadcast service according to an embodiment of the present disclosure includes a transceiver configured to obtain a maximum value among fixed end-to-end delay values of at least two networks when the broadcast service is provided over the at least two networks and a controller configured to control output points in time of a receiver having received packets of the broadcast service, based on the maximum value.

A receiver for receiving a broadcast service according to an embodiment of the present disclosure includes a transceiver configured to receive output point-in-time control information that is configured based on a maximum value among fixed end-to-end delay values of at least two networks when the broadcast service is provided over the at least two networks and a controller configured to determine whether there is a packet having an output point in time preceding an output point in time that is set based on the output point-in-time control information, upon receiving packets of the broadcast service over the networks, and if there is the packet having the output point in time preceding the set output point in time, to wait until the set output point in time and to output the packet at the set output point in time.

Advantageous Effects

According to the present disclosure, if a single broadcast service is transmitted over different networks, transmission and output of packets of the broadcast service are controlled based on delay characteristics of the networks, such that a receiver may output the packets at the same points in time.

BRIEF DESCRIPTION OF DRAWINGS

FIG. 5 illustrates an example of an HRBM message structure including a parameter for setting a maximum transmission delay of a receiver according to an embodiment of the present disclosure;

MODE FOR CARRYING OUT THE INVENTION

Figure 1:
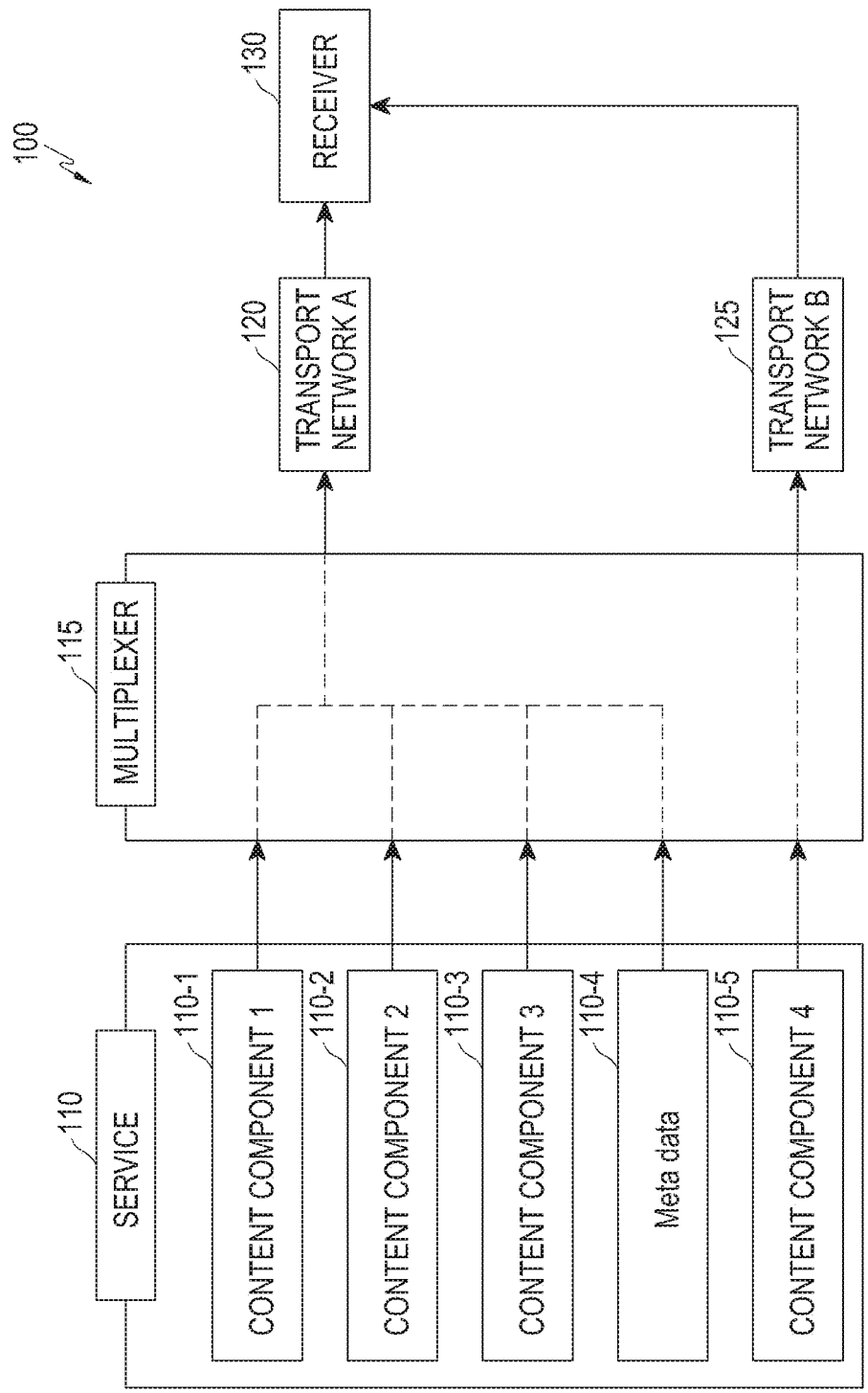
FIG. 1 illustrates an example of an environment providing a heterogeneous-based broadcast service to which an embodiment of the present disclosure is to be applied.

Hereinafter, the operating principles of exemplary embodiments of the present disclosure will be described with reference to the accompanying drawings. Like components are referred to as like reference numerals even though being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

FIG. 1 illustrates an example of an environment providing a heterogeneous network-based broadcast service to which an embodiment of the present disclosure is to be applied.

Referring to FIG. 1, an embodiment of the present disclosure is applied to a structure in which a single broadcast service 110 is provided to a receiver 130 through different networks. For example, it is assumed that the broadcast service 110 is transmitted to the receiver 130 through two transmission networks, i.e., a transport network A 120 and a transport network B 125. Hereinbelow, it is assumed that in an embodiment of the present disclosure, transport networks are capable of supporting Moving Picture Experts Group (MPEG) media transport (MMT) for providing a multimedia service through heterogeneous packet exchange networks including an Internet protocol (IP) network and a digital broadcast network. However, transport networks according to an embodiment of the present disclosure are not necessarily limited to networks supporting MMT. For example, a transport network according to an embodiment of the present disclosure may include a terrestrial broadcast network and a broadband network.

The broadcast service 110 is assumed to include, for example, four content components, components 1 through 4 110-1, 110-2, 110-3, and 110-5, and metadata 110-4. Herein, each content component and the metadata may be transmitted through at least one packet. Then, the content components and the metadata of the service 110 are delivered to the receiver 130 through a multiplexer 115 over the transport network A 120 and the transport network B 125. The multiplexer 115 may include a packet generator which converts the content components and the metadata into transmission packets suitable for transmission and a distributor which distributes the contents components and the metadata to the transport network A 120 and the transport network B 125, although the packet generator and the distributor are not shown in the drawings. Depending on an embodiment, the distributor may be on a front stage or a rear stage of the packet generator; if the distributor is located on the front stage of the packet generator, the distributor may distribute the service 110 to the transport network A 120 and the transport network B 125 in the unit of a content component, and if the distributor is located on the rear stage of the packet generator, the distributor may distribute the service 110 to the transport network A 120 and the transport network B 125 in the unit of a transmission packet. More specifically, it is assumed that content components 1 through 3 and metadata 110-1 through 110-4 are delivered to the transport network A 120 and a content component 4 110-5 is delivered to the transport network B 125. The content components 110-1 through 110-3 and 110-5 and the metadata 110-4 are converted into transmission packets suitable for transmission and then transmitted through different transport networks, i.e., the transport network A 120 and the transport network B 125. The transport network A 120 and the transport network B 125 have different delay characteristics depending on a physical medium of the network, arrangement of network components, an operator's policy, and so forth. As a result, each of packets transmitted over the transport network A 120 and each of packets transmitted over the transport network B 125 may take different amounts of time to arrive at the receiver 130.

Thus, the present disclosure proposes a method and apparatus for controlling a transmission time of packets of one broadcast service and an output time of the packets by a receiver based on delay characteristics of at least two different networks when the broadcast service is provided through the networks.

More specifically, an embodiment of the present disclosure proposes a scheme for controlling transmission and reception times of packets of a broadcast service provided through heterogeneous networks, based on hypothetical receiver buffer model (HRBM) of MMT used for a fixed delay between packets transmitted and received between ends, i.e., a transmission entity and a reception entity.

Figure 2:
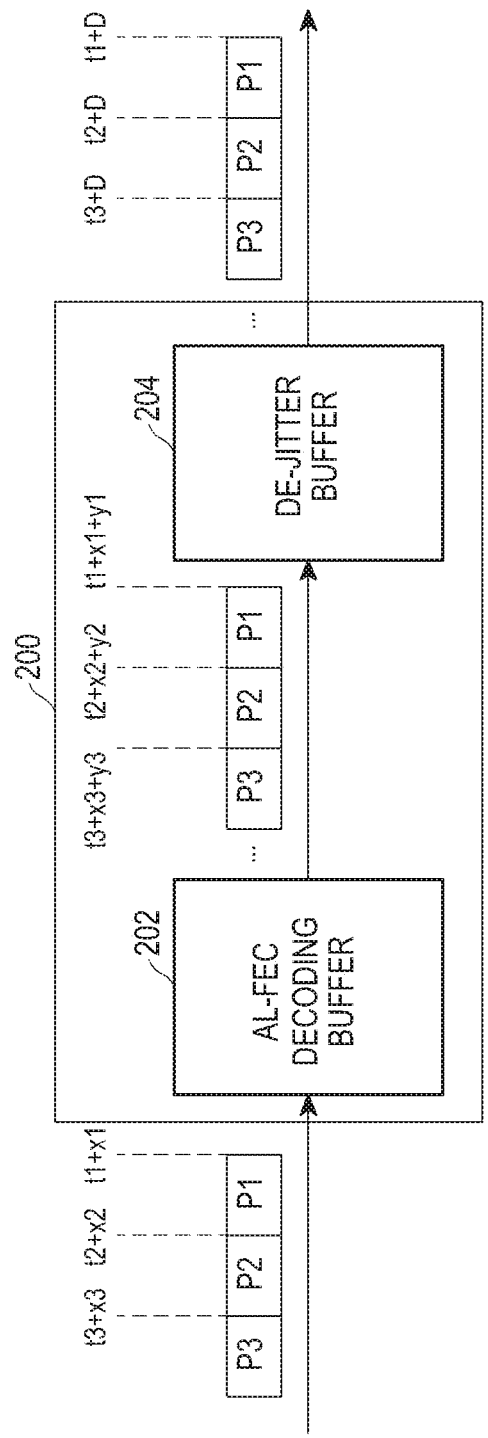
FIG. 2 is a structural diagram of a hypothetical receiver buffer model (HRBM)-applied receiver to which an embodiment of the present disclosure is to be applied.

FIG. 2 is a structural diagram of a HRBM-applied receiver to which an embodiment of the present disclosure is to be applied.

Referring to FIG. 2, an HRBM-applied receiver may include two buffer structures. Herein, the structure of a receiver 200 merely shows components necessary for the embodiment of the present disclosure, and the embodiment of the present disclosure is not limited by the illustrated structure of the receiver 200.

More specifically, the receiver may include, for example, an application layer-forward error correction (AL-FEC) decoding buffer 202 and a de-jitter buffer 204. AL-FEC is used for a receiver to recover a packet lost in a network, and is generally implemented by configuring a source block by collecting a predetermined number of transmission packets and transmitting repair packets generated by applying a pre-agreed algorithm to the source block. Hereinbelow, all transmission packets of one source block and all repair packets generated from the source block will be collectively referred to as a 'FEC packet block'. As illustrated in FIG. 2, it is assumed that a transmission entity transmits packets P1, P2, and P3 of an arbitrary one of content components of a single broadcast service to the receiver over an arbitrary transport network. It is also assumed that the packets P1, P2, and P3 are included in an identical source block. Thus, the packets P1, P2, and P3 are input to the AL-FC decoding buffer 202. It is assumed that the transmission entity transmits the packets P1, P2, and P3 at transmission points in time t1, t2, and t3, respectively. Then, input points in time of the packets P1, P2, and P3 with respect to the AL-FEC decoding buffer 200 may be 't1+x1', 't2+x2', and 't3+x3' obtained by adding transmission delays x1, x2, and x3 of the packets P1, P2, and P3, occurring due to delay characteristics of corresponding transport networks, to the transmission points in time of the packets P1, P2, and P3. AL-FEC decoding is performed with respect to the packets P1, P2, and P3 input to the AL-FEC decoding buffer 202, and the AL-FEC decoding result is output. For the packets P1, P2, and P3, delays y1, y2, and y3 due to AL-FEC decoding occurs. Thus, the packets P1, P2, and P3 output from the AL-FEC decoding buffer 202 are input to the de-jitter buffer 204 at input points in time 't1+x1+y1', 't2+x2+y2', and 't3+x3+y3'.

Meanwhile, the de-jitter buffer 204 absorbs a delay jitter of a transport network and a delay occurring due to AL-FEC decoding. The packets P1, P2, and P3 passing through the de-jitter buffer 204 may be regarded as being transmitted over a transport network having a fixed delay D. As a result, output points in time of the packets P1, P2, and P3 passing through the de-jitter buffer 204 may be 't1+D', 't2+D', and 't3+D'.

General HRMB is set for each content component corresponding to an asset, and a value of D is determined by an MMT transmission entity and delivered to the receiver 200 through an MMT signaling message. For example, the value of D may be calculated by summing a maximum value among delay values generated due to characteristics of a transport network and 'AL-FEC protection window time' as follows:

$$D = \max(x1, x2, x3, \ldots) + \text{AL-FEC protection window time} \quad \text{Equation (1)}$$

where x1, x2, and x3 indicate delays occurring due to characteristics of a transport network, and the AL-FEC protection window time indicates a window time in which AL-FEC decoding is performed. That is, the AL-FEC protection window time is defined as a maximum value of a difference between a transmission point in time of a packet transmitted first among packets of an FEC packet block that is the unit of AL-FEC encoding and decoding and a transmission point in time of a packet transmitted last among the packets of the FEC packet block.

Figure 3:
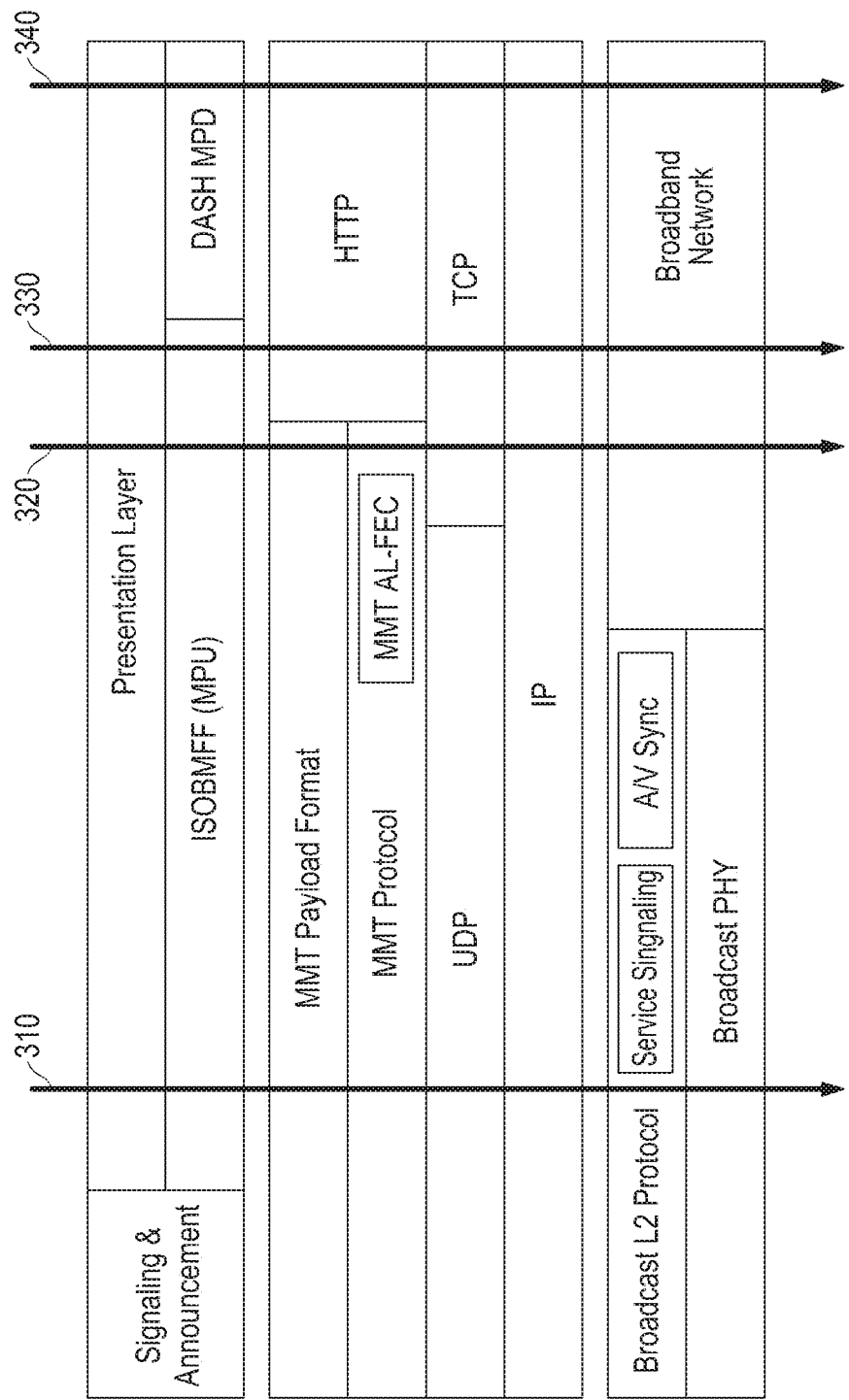
FIG. 3 illustrates an example of a protocol stack of heterogeneous networks according to an embodiment of the present disclosure.

FIG. 3 illustrates an example of a protocol stack of heterogeneous networks according to an embodiment of the present disclosure.

Referring to FIG. 3, it is assumed that heterogeneous networks include, for example, a broadcast network and a broadband network. It is also assumed that at least one content component of a broadcast service passes through a protocol stack 310 corresponding to the broadcast network. The protocol stack 310 corresponding to the broadcast network may be assumed to be a main broadcast path, and in this case, the broadcast network is controlled by at least one operator and transmission delay and jitter of the broadcast network have smaller values than a network that is not controlled by an operator such as Internet, etc. The transmission delay and the jitter may be obtained through measurement in an initial network designing process.

The protocol stack corresponding to the broadband network are additional broadcast paths of the main broadcast path, and may be classified into a case having an MMT protocol (MMTP) and a case not having the MMTP. First, when the content component passes through a protocol stack 320 corresponding to the broadband network having the MMTP, longer delay and jitter occur than when the content component passes through the protocol stack 310 corresponding to the broadcast network. The occurring delay and jitter may be measured using a timestamp. More specifically, when the content component passes through the protocol stack 320 corresponding to the broadband network, that is, when the content component is transmitted after being converted into an MMTP packet using the MMTP, a transmission point in time of a corresponding packet may be transmitted through a header of the MMTP packet.

Herein, the protocol stack 310 corresponding to the broadcast network and the protocol stack 320 corresponding to the broadband network using the MMTP include in common a presentation layer for actually presenting each service to a user, an ISO-based media file format (ISOBMFF) that is an expression format of content components, an MMT payload format for efficiently transmitting a data unit including the ISOBMFF, an MMTP, and an IP. For the MMTP, a part for MMT AL-FEC for AL-FEC is included. The protocol stack 310 corresponding to the broadcast network further includes a broadcast L2 protocol and a broadcast PHY layer. The broadcast L2 protocol is a protocol for efficiently transmitting upper layer packets including an IP packet through the broadcast PHY layer, and may have a function of transmitting separate control information for service signaling and audio/video (A/V) synchronization as well as data to be delivered through the upper layer packets. The protocol stack 310 corresponding to the broadcast network includes a user datagram protocol (UDP), whereas protocol stacks 320, 330, and 340 corresponding to additional paths of the main broadcast path include a transmission control protocol (TCP). The protocol stacks 330 and 340 corresponding to the broadband network having no MMTP include a presentation layer, a dynamic adaptive streaming over HTT (DASH), an HTTP, and the broadband network. The DASH converts a content component into a DASH segment, which is a sort of ISOBMFF, for transmission, and information about the segment is delivered through media presentation description (MPD).

When the content component passes through the protocol stacks 330 and 340 corresponding to the broadband network having no MMTP, longer delay and jitter occur than when the content component passes through the protocol stack 310 corresponding to the broadcast network. In this case, a header of a packet corresponding to the protocol does not include a field indicating a point in time at which the packet is transmitted, and thus, to measure delay and jitter occurring in a transport network, a separate measurement mechanism is needed.

Hereinafter, a description will be made of a first embodiment where heterogeneous networks providing one broadcast service correspond to servers of a single broadcast station and a second embodiment where the heterogeneous networks correspond to different broadcast stations.

First, in the first embodiment, it is assumed that one broadcast service is provided through the servers of the single broadcast station. In this case, it may be assumed that packets of content components to be played at the same point in time are transmitted through the respective servers at the same transmission point in time.

Figure 4A:
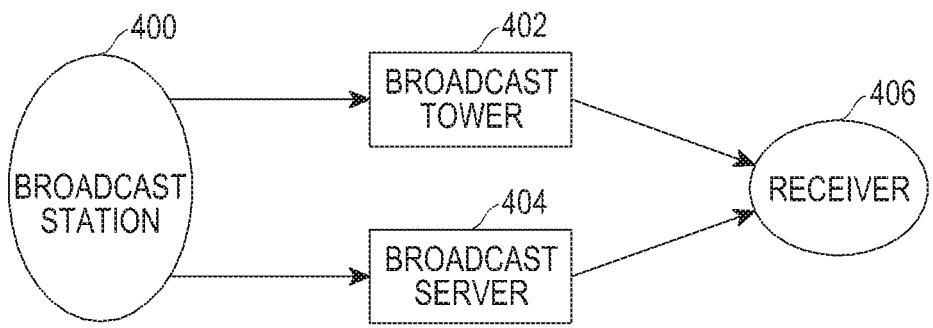
FIG. 4A illustrates an example of a data transmission structure in heterogeneous networks according to a first embodiment of the present disclosure.

FIG. 4A illustrates an example of a data transmission structure in heterogeneous networks according to the first embodiment of the present disclosure.

Referring to FIG. 4A, a broadcast station 400 may include a broadcast tower 402 or at least one broadcast server 404 to provide different contents for an arbitrary broadcast service.

For example, the broadcast station 400 may assume that a voice service based on another language for a live news of a particular accident is provided. It is assumed that for the news, the broadcast tower 402 provides packets of each content component corresponding to video and voice in Korean and the broadcast server 404 provides a packet of a content component corresponding to voice in English. In this case, a receiver 406 may select and receive Korean voice and English voice for the news through the broadcast tower 402 and the broadcast server 404.

Figure 4B:
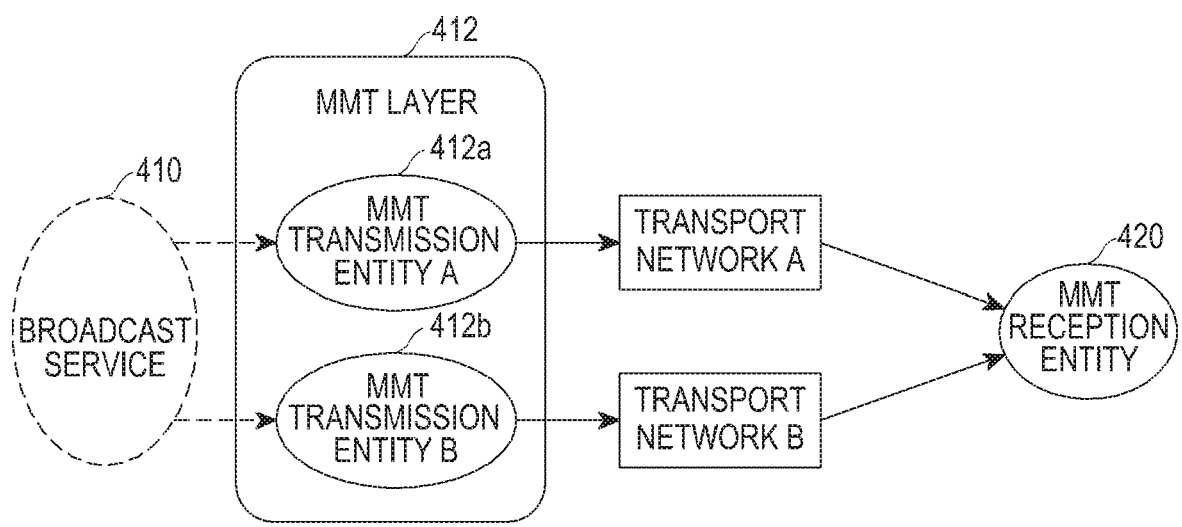
FIG. 4B illustrates an example in which a data transmission structure in heterogeneous networks is applied to Moving Picture Experts Group (MPEG) media transport (MMT) according to the first embodiment of the present disclosure.

FIG. 4B illustrates an example in which a data transmission structure in heterogeneous networks is applied to MMT according to the first embodiment of the present disclosure.

FIG. 4B shows a case where the broadcasting service 410 provided by a broadcast station described with reference to FIG. 4A, that is, the news is provided through two transmission entities A and B 412a and 412b configured based on a single MMT layer 412. Herein, the transmission entity A 412a and the transmission entity B 412b provide different contents of the news to a reception entity over different transport networks. Thus, the transmission entity A 412a and the transmission entity B 412b may correspond to the broadcast tower 402 and the at least one broadcast server 404 of the single broadcast station 400 of FIG. 4A, respectively.

Figure 4C:
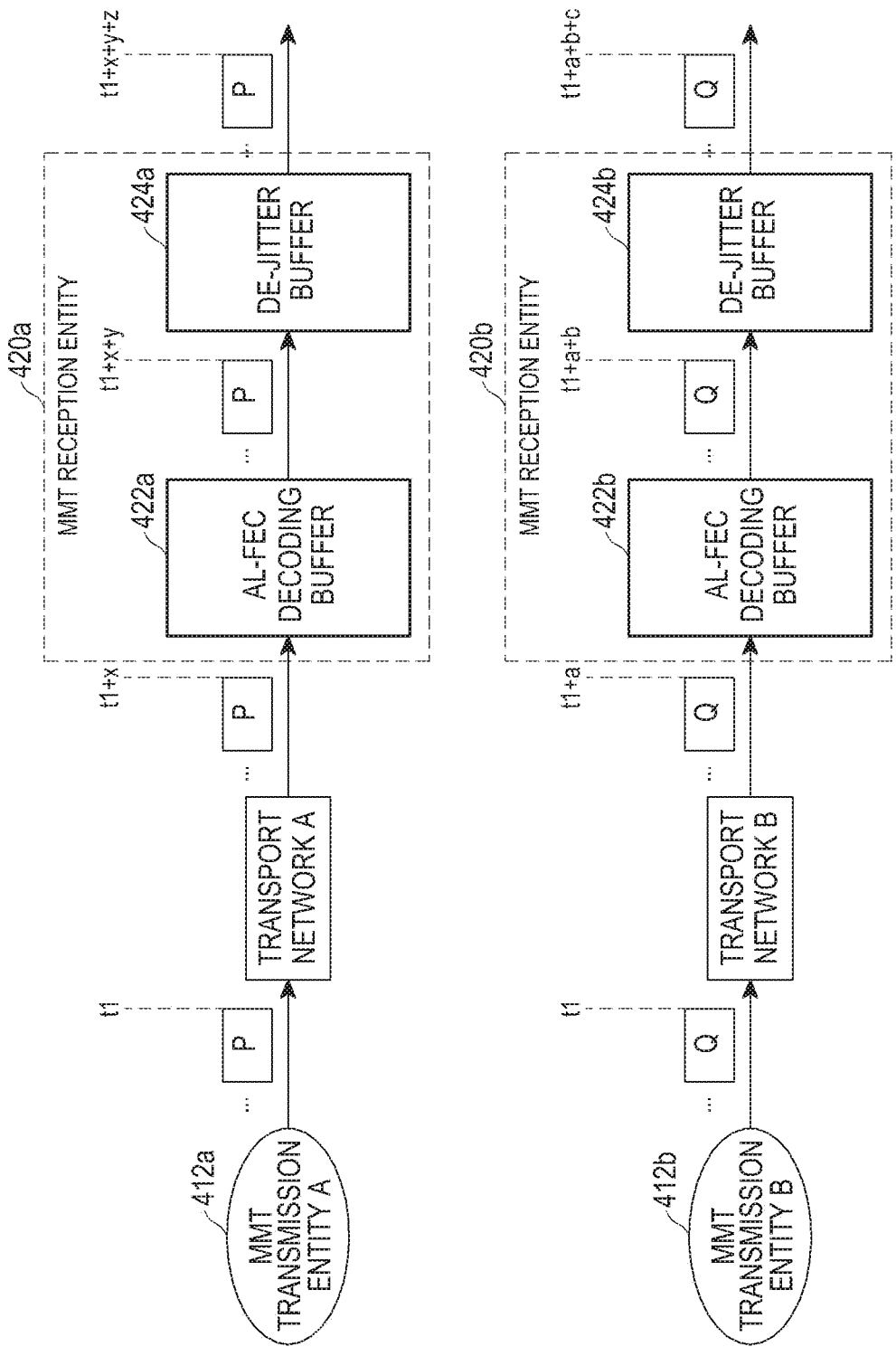
FIG. 4C is a view for describing a synchronization process in single MMT layer-based heterogeneous networks according to the first embodiment of the present disclosure.

FIG. 4C is a view for describing a synchronization process in single MMT layer-based heterogeneous networks according to the first embodiment of the present disclosure. For convenience, a configuration shown in FIG. 4C will be described based on the data transmission structure shown in FIG. 4B. Herein, an MMT reception entity 420 shown in FIG. 4A has been illustrated as an MMT reception entity a 420a and an MMT reception entity b 420b for different cases where packets are received over different transport networks, that is, the transport networks A and B.

FIG. 4C shows a case where the MMT transmission entity A 412a and the MMT transmission entity B 412b deliver packets P corresponding to Korean voice of the single broadcast service 400, i.e., the news, and packets Q corresponding to English voice of the news over the transport networks A and B, respectively. Herein, the MMT transmission entity A 412a and the MMT transmission entity B 412b are based on a single MMT layer, such that the transmission point in time t1 is the same, whereas as a corresponding content component is transmitted over different transport networks, delay and jitter may occur due to characteristics of the transport networks.

First, it is assumed that the MMT transmission entity 412a transmits one of the content components of the broadcast service 400, a content component P, at the transmission point in time t1 over the transport network A. Then, the content component P transmitted over the transport network A is received by the MMT reception entity a 420a. Herein, it is assumed that the MMT reception entity a 420a is illustrated as a schematic structure to which an embodiment of the present disclosure is applied like the structure of a receiver shown in FIG. 2. Thus, for example, the MMT reception entity a 420a may include an AL-FEC decoding buffer 422a and a de-jitter buffer 424a. However, it should be noted that a structure in which HRBM is applied to an MMT reception entity described herein is described as an example for convenience, and an embodiment of the present disclosure is not limited to the MMT reception entity having the HRBM-applied structure.

The input point in time of the content component P input to the AL-FEC decoding buffer 422a becomes 't1+x' because delay/jitter x occurs due to characteristics of the transport network A. Delay y occurring due to AL-FEC decoding is added to the content component P that is AL-FEC-decoded through the AL-FEC decoding buffer 422a, such that the AL-FEC-decoded content component P is input to the de-jitter buffer 424a at a point in time 't1+x+y'. Then, the de-jitter buffer 424a controls the output point in time of the content component P based on the delay D received in advance from the MMT transmission entity 412a, such that the output content component P has a fixed delay from the transmission point in time t1. If the delay D is 'x+y+z', the output point in time of the de-jitter buffer 424a is 't1+x+y+z'.

Next, it is assumed that the MMT transmission entity B 412b transmits one of the content components of the broadcast service 400, a content component Q, at the same transmission point in time t1 as the transmission point in time of the MMT transmission entity A 412a over the transport network B. Then, the content component Q transmitted over the transport network B is received by the MMT reception entity b 420b. For example, the MMT reception entity b 420b is assumed to include an AL-FEC decoding buffer 422b and a de-jitter buffer 424b. The input point in time of the content component Q input to the AL-FEC decoding buffer 422b becomes 't1+a' because delay/jitter a occurs due to characteristics of the transport network B. Delay b occurring due to AL-FEC decoding is added to the content component Q that is AL-FEC-decoded through the AL-FEC decoding buffer 422b, such that the AL-FEC-decoded content component Q is input to the de-jitter buffer 424b at a point in time 't1+a+b'. Then, the de-jitter buffer 424b controls the output point in time of the content component Q based on the delay D received in advance from the MMT transmission entity 412b, such that the output content component Q has a fixed delay from the transmission point in time t1. If the delay D is 'a+b+c', the output point in time of the de-jitter buffer 424b is 't1+a+b+c'. As a result, output points in time of the content components P and Q transmitted through the transport network A and the transport network B having different delay characteristics, respectively, are 't1+x+y+z' and 't1+a+b+c'. Thus, in an embodiment of the present disclosure, a fixed end-to-end delay is set to control an output point in time of the de-jitter buffer included in the receiver, such that output points in time of packets input over different transport networks may be coincide with each other. It should be noted that in the fixed end-to-end delay, a time necessary for AL-FEC decoding is regarded as a part of delay occurring in a transport network.

Hereinbelow, the "fixed end-to-end delay" in an embodiment of the present disclosure corresponds to an output point in time of a received packet of a receiver that receives packets of an identical service over heterogeneous networks. More specifically, the fixed end-to-end delay according to an embodiment of the present disclosure may be set based on a maximum value among fixed end-to-end delays for networks over which packets input to the receiver are transmitted. To be more specific, as to the fixed end-to-end delay according to an embodiment of the present disclosure, if a hybrid delivery environment is established between at least two servers provided by one broadcast station and the receiver, the receiver may measure transmission delays from the servers during an initial setup process and deliver a maximum value among the measured transmission delays to at least one transmitter. The transmitter having received the maximum value may inform the receiver of a fixed end-to-end delay calculated using the maximum value and the AL-FEC protection window time. If there are a plurality of receivers, the transmitter may set a maximum value among maximum values of the servers for each receiver and provide the set maximum value as the fixed end-to-end delay.

The receiver then sets an output point in time of each received packet by using the fixed end-to-end delay. The receiver outputs packets of an identical service received from the servers after delaying them by the maximum value from a transmission point in time. For example, if there are packets having a shorter delay than the maximum value among the received packets, the receiver may output such packets after further delaying them by a difference between the delay and the maximum value.

According to another embodiment, servers providing a single broadcast service to a receiver obtain delay characteristics of each server during the initial setup process and informs the receiver of a maximum delay value as the fixed end-to-end delay.

According to another embodiment, if the receiver does not use AL-FEC, the respective servers obtain their delay characteristics during the initial setup process. The server having a maximum transmission delay value among the servers sets the maximum value as the fixed end-to-end delay, and informs the server having a shorter transmission delay than the maximum value of the fixed end-to-end value. In the manner described above, a maximum value among fixed end-to-end delays of transport networks for transmitting a single broadcast service is set as the fixed end-to-end delay according to the first embodiment of the present disclosure. Thus, packets input to a receiver over different transport networks are output after being delayed by the maximum value from a transmission point in time. For example, the transmission point in time may be a point at which the MMT transmission entity A 412a or the MMT transmission entity B 412b illustrated in FIG. 4C outputs an MMTP packet.

Meanwhile, the fixed end-to-end delay set as described above may be set as a parameter in an HRBM message and delivered to the receiver.

FIG. 5 illustrates an example of an HRBM message structure including a parameter for setting a maximum transmission delay of a receiver according to an embodiment of the present disclosure.

Referring to FIG. 5, an HRBM parameter used to calculate a fixed end-to-end delay for packets of a single broadcast service delivered over transport networks having different delay characteristics according to an embodiment of the present disclosure is delivered to a reception side through an HRBM message, which is one of signaling messages for package delivery from MMT. The HRBM message may include 'message id' for identifying the HRBM message, version, length, extension, and messge_payload. The HRBM parameters according to an embodiment of the present disclosure may include, for example, 'max_buffer_size', 'fixed_end_to_end_delay', and 'max_transmission_delay', which may be included in message_payload. More specifically, 'max_buffer_size' indicates a maximum buffer size required for content components of a broadcast service. The buffer size may be expressed, for example, in byte units. 'max_transmission_delay' is defined as a maximum value of a transmission delay between a transmission entity and a reception entity. If a transport network is a broadcast network, 'max_transmission_delay' may be a preset value obtained using a timestamp value or the like during initial network designing.

'fixed_end_to_end_delay' is defined as a fixed end-to-end delay corresponding to each of the transmission entity and the reception entity. Then, 'fixed_end_to_end_delay' may be defined as a sum of 'max_transmission_delay' and 'FEC_prtection_window_time'. Herein, FEC_prtection_window_time is defined as a maximum value of a difference between a transmission point in time of a packet transmitted first among packets of an FEC packet block that is the unit of AL-FEC encoding and decoding and a transmission point in time of a packet transmitted last among the packets of the FEC packet block.

Based on the above-described HRBM message structure, a maximum transmission delay according to the first embodiment of the present disclosure is defined as follows, and may be used to adjust an output point in time of a de-jitter buffer of each MMT reception entity.

$$T\_de\_jitter\_out\_time = ts + \text{delta} \qquad \text{Equation (2)}$$

where is indicates a timestamp of a packet received by an MMT reception entity. The timestamp corresponds to a transmission point in time of the packet by an MMT transmission entity. delta is defined as 'fixed_end_to_end_delay' of the HRBM message. A packet failing to be received until T_de_jitter_out_time is regarded as a packet lost in a network.

For example, let the transport network A have shorter transmission delay and jitter than the transport network B in the first embodiment of the present disclosure. In this case, the MMT transmission entity B 412b of FIG. 4C sets transmission characteristics of the transport network B having longer transmission delay and jitter as an HRBM parameter and informs the MMT transmission entity A 412 of the HRBM parameter during the initial network setup process. Herein, the transmission characteristics of the transport network B correspond to 'max_transmission_delay' of the transport network B, and may be transmitted through an HRBM message. The HRBM message may be transmitted periodically, or for each content component to be transmitted or each particular event.

Meanwhile, the MMT transmission entity A 412 may use 'max_transmission_delay' received from the MMT transmission entity B 414. If there are a pluraltiy of users of the transport network B, 'max_transmission_delay' for each user is received and a maximum value among 'max_transmission_delay' values is set as a maximum transmission delay to control output of a de-jitter buffer of a reception MMT entity.

Although MMT transmission entities share only 'max_transmission_delay' in the current embodiment, it would be obvious that the MMT transmission entities may also share 'FEC_prtection_window_time' to use AL-FEC. Moreover, two MMT reception entities are shown in the embodiment of FIG. 4C, but the MMT reception entities may be physically or logically implemented as one entity in real implementation.

Figure 6A:
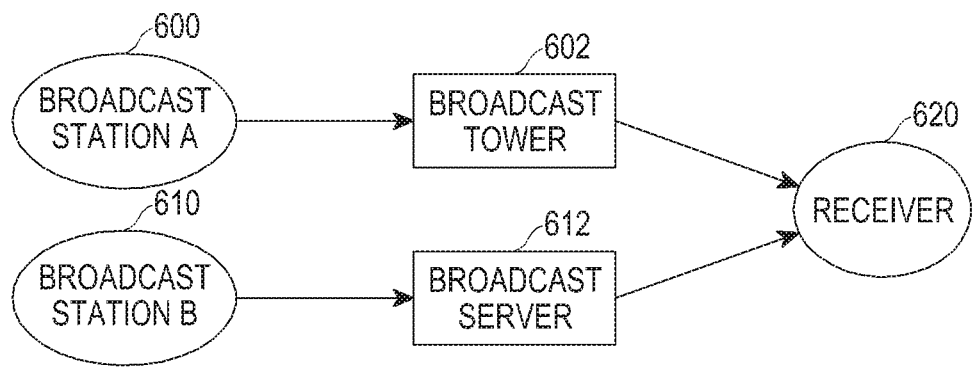
FIG. 6A illustrates an example of a data transmission structure in heterogeneous networks according to a second embodiment of the present disclosure.

FIG. 6A illustrates an example of a data transmission structure in heterogeneous networks according to a second embodiment of the present disclosure.

Referring to FIG. 6A, each of two broadcast stations A 600 and B 610 provides packets of a single broadcast service including at least one content components to a receiver 620 through a broadcast tower 602 and a broadband server 612. As stated above, it is assumed that the single broadcast service corresponds to a particular news, the broadcast tower 602 provides packets of content components corresponding to video and Korean audio of the news, and the broadband server 612 provides packets of content components corresponding to subtitles of the news. In this case, the broadcast tower 602 and the broadband server 612 are associated with different broadcast stations, and thus have different transmission points in time of the news.

Figure 6B:
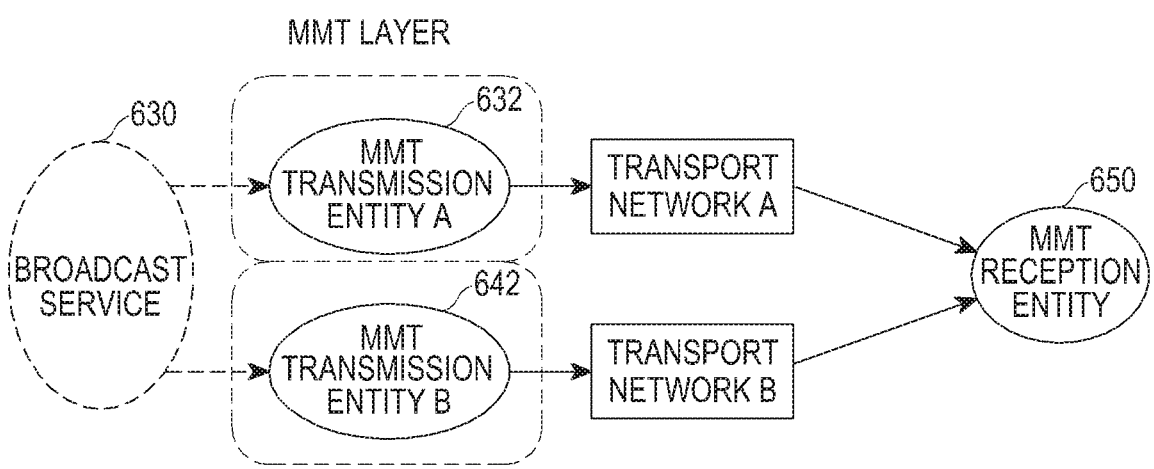
FIG. 6B illustrates an example in which a data transmission structure in heterogeneous networks is applied to MMT according to the second embodiment of the present disclosure.

FIG. 6B illustrates an example in which a data transmission structure in heterogeneous networks is applied to MMT according to the second embodiment of the present disclosure.

Referring to FIG. 6B, a transmission eneity A 632 and a transmission entity B 642 based on multiple MMT layers provide different contents of a service 630 corresponding to a single broadcast service provided by the broadcast station A 600 and the broadcast station B 610 in FIG. 6A to an MMT reception entity 650. Thus, the transmission entity A 632 and the transmission entity B 642 correspond to the broadcast tower 602 and the broadband server 612 connected to different broadcast stations in FIG. 6A, respectively.

Figure 6C:
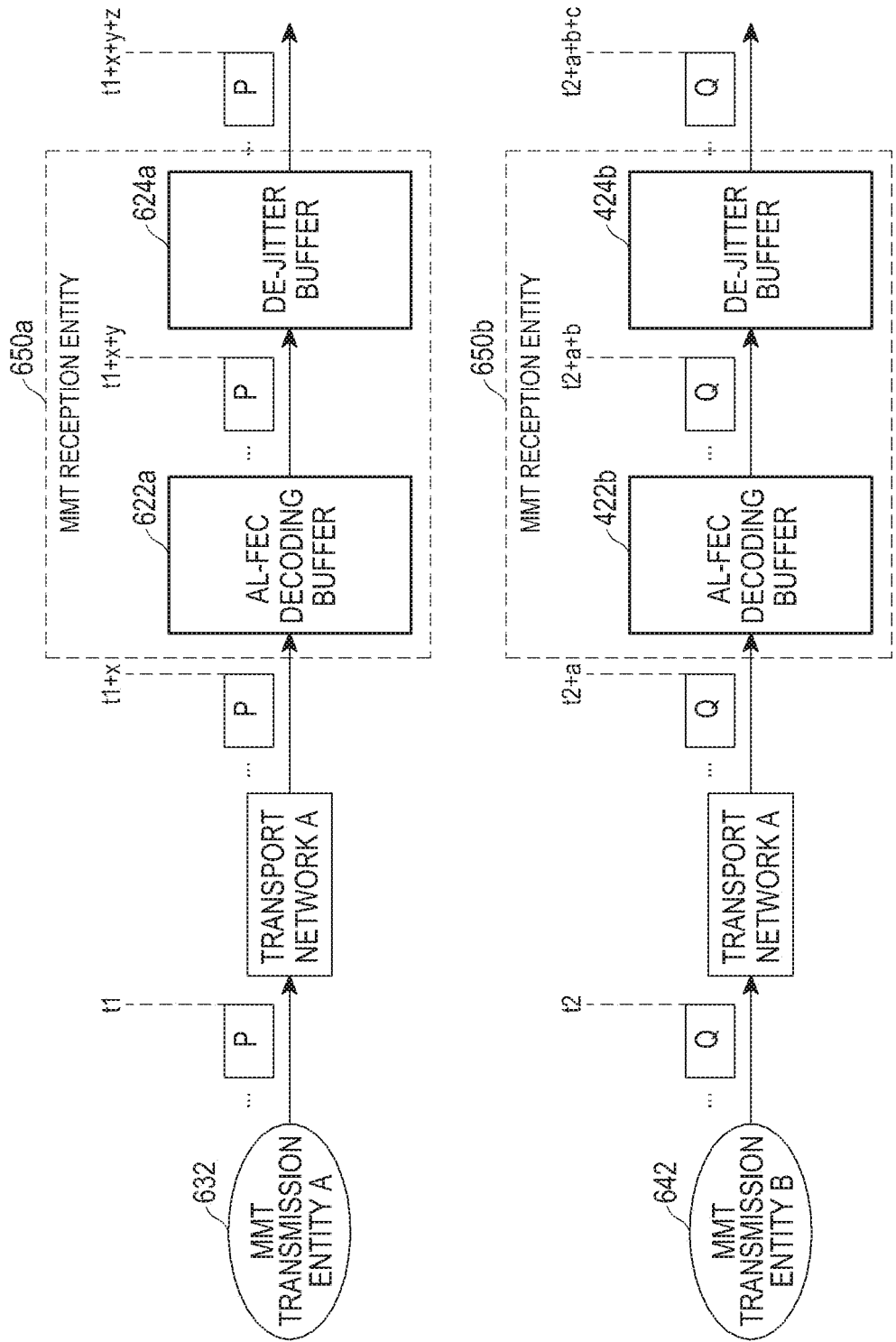
FIG. 6C is a view for describing a synchronization process in multiple MMT layer-based heterogeneous networks according to the second embodiment of the present disclosure.

FIG. 6C is a view for describing a synchronization process in multiple MMT layer-based heterogeneous networks according to the second embodiment of the present disclosure. For convenience, a configuration shown in FIG. 6C will be described based on the data transmission structure shown in FIG. 6B. Herein, an MMT reception entity 620 shown in FIG. 6A has been illustrated as an MMT reception entity a 650*a* and an MMT reception entity b 650*b* for different cases where packets are received over different transport networks, that is, the transport networks A and B.

FIG. 6C shows a case where an MMT transmission entity A 612 and an MMT transmission entity B 624 deliver packets P corresponding to Korean voice of the single broadcast service 600, i.e., the news, and packets Q corresponding to English voice of the news over the transport networks A and B, respectively. Herein, the MMT transmission entity A 632 and the MMT transmission entity B 642 transmit content components through different MMT layers, such that even when play points in time of the content components coincide with each other, transmission points in time may be different from each other. Herein, the MMT transmission entity A 632 and the MMT transmission entity B 642 transmit content components through different transport networks, such that delay and jitter occur due to characteristics of the transport networks.

First, it is assumed that the MMT transmission entity 632 transmits one of the content components of the broadcast service 630, the content component P, at the transmission point in time t1, which is set based on the characteristics of the transport network A, over the transport network A. Then, the content component P is received by the MMT reception entity a 650*a* over the transport network A. For convenience, it is assumed that the MMT reception entity a 650*a* may include an AL-FEC decoding buffer 652*a* and a de-jitter buffer 654*a*. The input point in time of the content component P input to the AL-FEC decoding buffer 652*a* becomes 't1+x' because delay/jitter x occurs due to characteristics of the transport network A 616. Delay y occurring due to AL-FEC decoding is added to the content component P that is AL-FEC-decoded through the AL-FEC decoding buffer 652*a*, such that the AL-FEC-decoded content component P is input to the de-jitter buffer 654*a* at a point in time 't1+x+y'. Then, the de-jitter buffer 654*a* controls the output point in time of the content component P based on the delay D received in advance from the MMT transmission entity 412*a*, such that the output content component P has a fixed delay from the transmission point in time t1. If the delay D is 'x+y+z', the output point in time of the de-jitter buffer 654*a* is 't1+x+y+z'. Next, it is assumed that the MMT transmission entity B 642 transmits one of the content components of the broadcast service 630, the content component Q, at a transmission point in time t2, which is set based on the characteristics of the transport network B, over the transport network B. Then, the content component Q transmitted over the transport network B is received by the MMT reception entity b 650*b*. For convenience, the MMT reception entity b 650*b* may include an AL-FEC decoding buffer 452*b* and a de-jitter buffer 454*b*. The input point in time of the content component Q input to the AL-FEC decoding buffer 452*b* becomes 't2+a' because the delay/jitter a occurs due to the characteristics of the transport network B. The delay/jitter b occurring due to AL-FEC decoding is added to the content component Q that is AL-FEC-decoded through the AL-FEC decoding buffer 452*b*, such that the AL-FEC-decoded content component Q is input to the de-jitter buffer 424*b* at the point in time 't2+a+b'. Then, the de-jitter buffer 454*b* controls the output point in time of the content component Q based on the delay D received in advance from the MMT transmission entity B 642, such that the output content component Q has a fixed delay from the transmission point in time t1. If the delay D is 'a+b+c', the output point in time of the de-jitter buffer 424*b* is 't1+a+b+c'.

To sum up, as the de-jitter buffer 654*a* and the de-jitter buffer 654*b* apply a fixed end-to-end delay according to an embodiment of the present disclosure, the output point in time 't1+x+y+z' at which the content component P is finally output from the de-jitter buffer 654*a* and the output point in time 't2+a+b+c' at which the content component Q is finally output from the de-jitter buffer 624*b* coincide with each other.

To be more specific, it is assumed that the MMT transmission entity A 612 transmits a content component P1 corresponding to video of the broadcast service 600 and a content component P2 corresponding to audio supporting Korean. It is also assumed that the MMT transmission entity B 614 transmits the content component Q corresponding to audio supporting English of the broadcast service 600. Herein, let data rates of the content components P2 and Q be set equal to each other. Consequently, MMTP packets corresponding to the content component P2 are assumed to be transmitted at transmission points in time t1, t2, and t3, respectively. Then, the MMT transmission entity B 614 monitors an MMTP packet flow of the MMT transmission entity A 612 and transmits MMTP packets corresponding to the content component Q at transmission points in time t1+a, t2+a, and t3+a which are results of adding a delay a occurring due to delay characteristics of the transport network B 618 to the transmission points in time of the content component P2, respectively. To reflect the delay a to a final output point in time of the content component P2, the MMT transmission entity B 642 notifies the MMT transmission entity A 632 of 'a', and sets a fixed end-to-end delay having a limited value based on 'a'. That is, when a single broadcast service is provided to a receiver over two networks, the fixed end-to-end delay value according to the second embodiment of the present disclosure may be set based on a difference between transmission points in time between the networks.

According to another embodiment, for the fixed end-to-end delay value, one of the two networks, which has the longer transmission delay, monitors a flow of the other having the shorter transmission delay to obtain a transmission time difference, sets a fixed end-to-end delay value including the obtained transmission time difference, and delivers the set fixed end-to-end delay value to a transmission entity of the network having the shorter transmission delay. Then, the transmission entity delivers the received fixed end-to-end delay value to the receiver. The receiver then delays received packets by a time corresponding to the fixed end-to-end delay value and outputs the packets over other networks at the same point in time.

According to another embodiment, if the transmission entity of the network having the shorter transmission delay receives a maximum value among fixed end-to-end delay values of networks providing a single broadcast service, the transmission entity may delay a transmission point in time for packets by a difference between the maximum value and the fixed end-to-end delay value of the transmission entity for the same output point in time of the de-jitter buffer of the receiver. The transmission entity of the network having the shorter transmission delay delivers the fixed end-to-end delay value ignoring other networks to the receiver through an HRBM message.

The fixed end-to-end delay value according to embodiments of the present disclosure may be delivered upon triggering of a predetermined event by the transmission entity to another transmission entity or at preset intervals. The MMT transmission entity according to an embodiment of the present disclosure transmits the fixed end-to-end delay value to the reception entity before start of the broadcast service or upon each transmission of contents.

Although packets of content components to be played at the same point in time in the receiver are transmitted by corresponding MMT transmission entities at the same points in time in the embodiment of the present disclosure illustrated in FIG. 4, the transmission points in time of the packets may be different due to an influence of internal processing time or the like as in the embodiment illustrated in FIG. 6.

Figure 7:
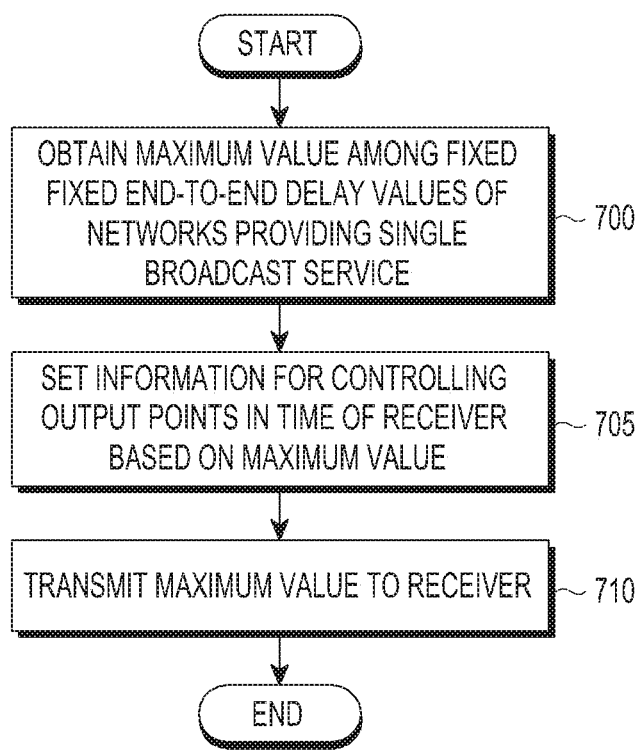
FIG. 7 is a flowchart illustrating operations of a transmission entity according to an embodiment of the present disclosure.

FIG. 7 is a flowchart illustrating operations of a transmission entity according to an embodiment of the present disclosure.

Referring to FIG. 7, in operation 700, when a single broadcast service is provided through at least two networks, the transmission entity receives a transmission delay time of the network having a maximum transmission delay time among the at least two networks. In operation 705, the transmission entity sets a fixed end-to-end delay value based on the maximum transmission delay time. In operation 710, the transmission entity transmits the set fixed end-to-end delay value to the receiver. The fixed end-to-end delay value may be transmitted each time when packets corresponding to a content component of a broadcast service are transmitted or at previously stored intervals. According to another embodiment, the fixed end-to-end delay value may be transmitted through a separate transmission protocol and a dedicated network, and may be stored in a storage medium for use.

The fixed end-to-end delay value may be set differently according to the first embodiment and the second embodiment. First, if for a broadcast service transmitted by the transmission entity, a transmission point in time of another transmission entity is set identical to that of the transmission entity according to the first embodiment of the present disclosure, the transmission entity obtains delay characteristics of the another transmission entity and sets the fixed end-to-end delay value or receives a set fixed end-to-end delay value from the another transmission entity and delivers the received fixed end-to-end delay value to the receiver. On the other hand, if for the broadcast service transmitted by the transmission entity, the transmission point in time of another transmission entity is set different from that of the transmission entity according to the second embodiment of the present disclosure, the transmission entity obtains a transmission time difference with the another transmission entity and sets the fixed end-to-end delay based on the transmission time difference.

Figure 8:
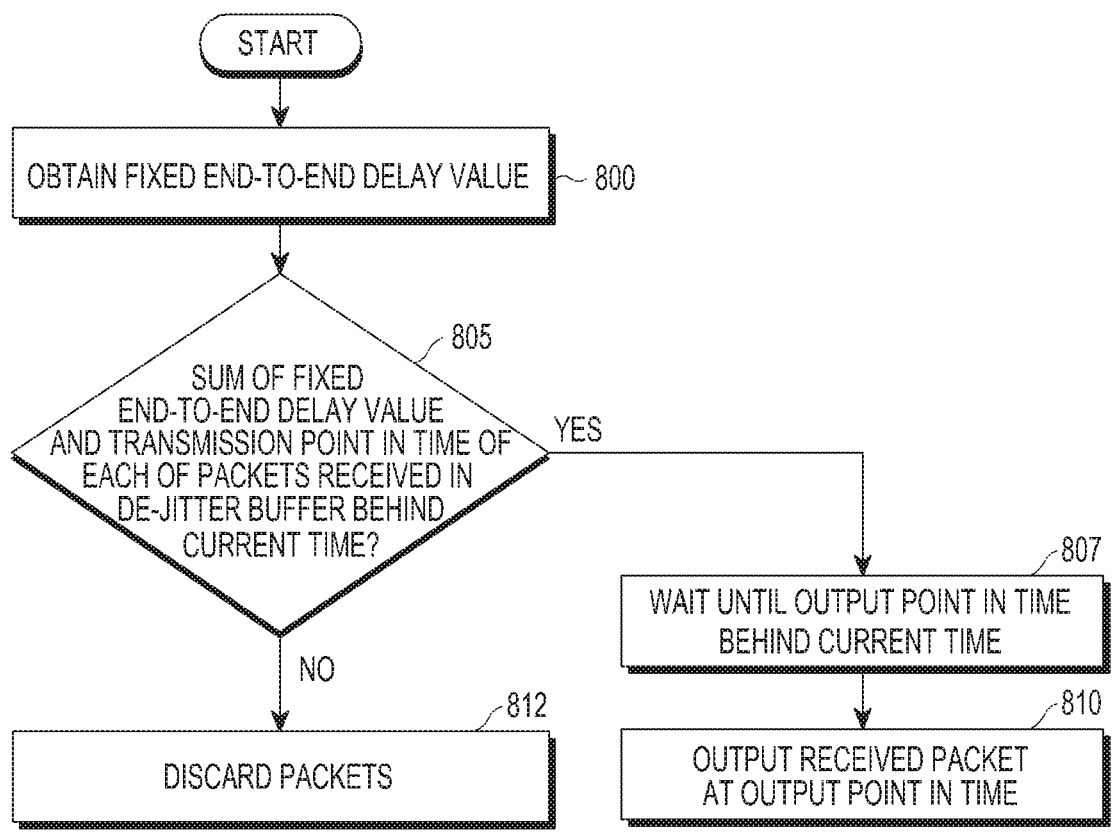
FIG. 8 is a flowchart illustrating operations of a reception entity according to an embodiment of the present disclosure.

FIG. 8 is a flowchart illustrating operations of a transmission entity according to an embodiment of the present disclosure.

Referring to FIG. 8, in operation 800, the reception entity obtains a fixed end-to-end delay value set based on a maximum value among transmission delay time values of at least two networks providing a single broadcast service. In operation 805, if recognizing that packets are received in a de-jitter buffer over the networks, the reception entity determines whether a sum of each transmission point in time of each received packet and the fixed end-to-end delay value is behind the current time of the reception entity. If determining that there is a packet having the output point in time that is behind the current time of the reception entity, the reception entity waits until an output point in time behind the current time in operation 807 and outputs the packets in operation 810. For packets having the output points in time preceding the current time of the reception entity, the reception entity determines that a packet loss occurs in a transport network and discards those packets.

The fixed end-to-end delay value may be set differently according to the first embodiment and the second embodiment as described with reference to FIG. 7, and a detailed description thereof will not be provided to avoid repetition.

Figure 9:
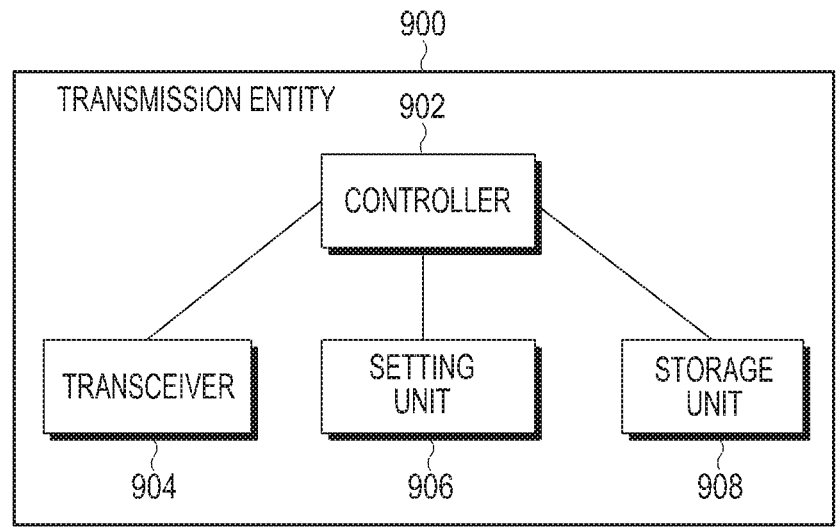
FIG. 9 is a block diagram of a transmission entity according to an embodiment of the present disclosure.

FIG. 9 is a block diagram of a transmission entity according to an embodiment of the present disclosure.

Referring to FIG. 9, a transmission entity 900 may include a controller 902, a transceiver 904, a setting unit 906, and a storage unit 908. Herein, the configuration of the transmission entity 900 is merely a schematic configuration according to an embodiment of the present disclosure, and thus, it should be noted that the transmission entity 900 may be configured differently according to operator's intention or embodiments.

The controller 920 controls the operations of the transmission entity described with reference to FIG. 7, and overall operations of the transceiver 904, the setting unit 906, and the storage unit 908. Once recognizing reception of a fixed end-to-end delay value from a network having a maximum fixed end-to-end delay value through the transceiver 904 according to an instruction of the controller 902, the controller 902 controls the setting unit 906 to set a fixed end-to-end delay value based on the received fixed end-to-end delay value. The storage unit 908 stores information generated according to an embodiment of the present disclosure, for example, fixed end-to-end delay values of respective networks, and so forth.

Figure 10:
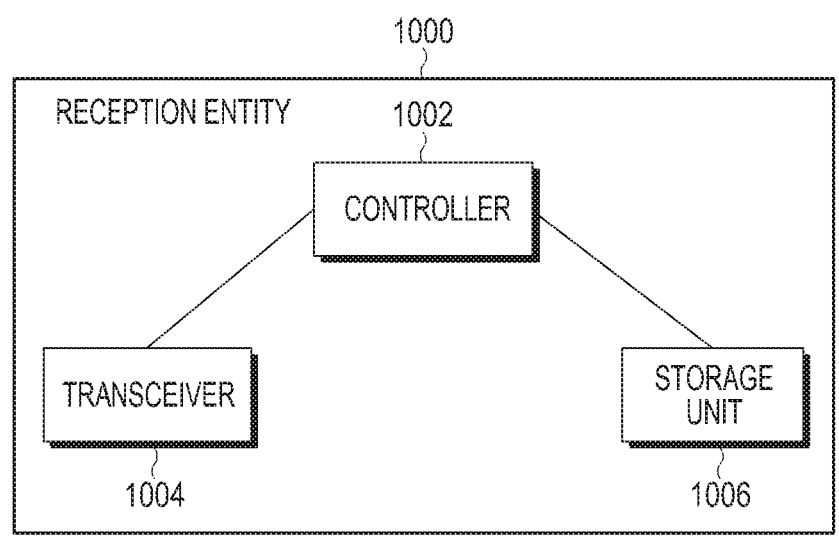
FIG. 10 is a block diagram of a reception entity according to an embodiment of the present disclosure.

FIG. 10 is a block diagram of a reception entity according to an embodiment of the present disclosure.

Referring to FIG. 10, a reception entity 1000 may include a controller 1002, a transceiver 1004, and a storage unit 1006. Herein, the configuration of the reception entity 1000 is merely a schematic configuration according to an embodiment of the present disclosure, and thus, it should be noted that the reception entity 1000 may be configured differently according to operator's intention or embodiments.

The controller 1002 controls the operations of the reception entity described with reference to FIG. 8, and overall operations of the transceiver 1004 and the storage unit 1006.

Once packets for a single broadcast service are received over different networks according to an instruction of the controller 1002, the transceiver 1004 delivers the received packets to the storage unit 1006. The storage unit 1006 then stores the packets. The output points in time of the packets are set to results of adding a fixed end-to-end delay value to the transmission points in time of the packets. The controller 1002 selects packets having output points in time behind the current time on a system of the receiver from among the received packets. For the selected packets, the controller 1002 controls the transceiver 1004 to wait until the output points in time coincide with the current time on the system of the receiver to output the selected packets. The transceiver 1004 then outputs the packets at the set output points in time according to an instruction of the controller 1002.

While embodiments of the present disclosure have been described, various changes may be made without departing the scope of the present disclosure. While the present disclosure has been particularly shown and described with reference to exemplary embodiments thereof, various changes in form and detail may be made therein without departing from the spirit and scope of the present disclosure as defined by the following claims. Accordingly, the scope of the present disclosure will be defined by the appended claims and equivalents thereto.

The invention claimed is:

1. A method for transmitting a transport packet by a sending entity in a broadcast system, the method comprising:
   identifying service data of a broadcast service and signalling data including information for a transmission delay, the service data including at least one component;
   generating at least one transport packet including the signalling data; and
   transmitting the at least one transport packet,
   wherein the signalling data includes maximum buffer size information providing information for a required maximum buffer size of the at least one component, fixed end-to-end delay information providing information for a fixed end-to-end delay between the sending entity and a receiving entity receiving the at least one transport packet, and maximum transmission delay information providing information for maximum transmission delay between the sending entity and the receiving entity, and
   wherein the fixed end-to-end delay is calculated by summing the maximum transmission delay and forward error correction (FEC) protection window time.

2. The method of claim 1, further comprising:
   transmitting at least one transport packet including the service data to the receiving entity,
   wherein the transmitting of the at least one transport packet including the service data to the receiving entity comprises:
   transmitting, via a first transport network, a first transport packet including a portion of a first component to the receiving entity, and
   transmitting, via a second transport network, a second transport packet including a portion of a second component to the receiving entity.

3. The method of claim 2, wherein fixed end-to-end delay information for the first transport network and the second transport network is set as a value such that a time at which the first transport packet is outputted from a first de-jitter buffer of the receiving entity is same with a time at which the second transport packet is outputted from a second de-jitter buffer of the receiving entity.

4. The method of claim 2, wherein, when a transmission time of the first transport packet is same with a transmission time of the second transport packet, the fixed end-to-end delay information for the first transport network and the second transport network is set as a maximum value among a first fixed end-to-end delay for the first transport network and a second fixed end-to-end delay for the second transport network.

5. The method of claim 2, wherein the first transport network is a broadcast network and the second transport network is a broadband network.

6. A method for receiving a transport packet by a receiving entity in a broadcast system, the method comprising:
   receiving a plurality of transport packets from a sending entity, the plurality of transport packets including at least one first transport packet comprising signalling data including information for a transmission delay and at least one second transport packet comprising service data of a broadcast service, the service data including at least one component;
   obtaining the signalling data from the at least one first transport packet; and
   processing the at least one second transport packet based on the signalling data,
   wherein the signalling data includes maximum buffer size information providing information for a required maximum buffer size of the at least one component, fixed end-to-end delay information providing information for a fixed end-to-end delay between the sending entity and the receiving entity, and maximum transmission delay information providing information for maximum transmission delay between the sending entity and the receiving entity, and
   wherein the fixed end-to-end delay calculated by summing the maximum transmission delay and forward error correction (FEC) protection window time.

7. The method of claim 6, wherein the at least one second transport packet includes a first packet including a portion of a first component and a second packet including a portion of a second component, the first packet being received from the sending entity via a first transport network and the second packet being received from the sending entity via a second transport network.

8. The method of claim 7, wherein fixed end-to-end delay information for the first transport network and the second transport network is set as a value such that a time at which the first packet is outputted from a first de-jitter buffer of the receiving entity is same with a time at which the second packet is outputted from a second de jitter buffer of the receiving entity.

9. The method of claim 7, wherein when a transmission time of the first packet is same with a transmission time of the second packet, the fixed end-to-end delay information for the first transport network and the second transport network is set as a maximum value among a first fixed end-to-end delay for the first transport network and a second fixed end-to-end delay for the second transport network.

10. The method of claim 7, wherein the first transport network is a broadcast network and the second transport network is a broadband network.

11. A sending entity for transmitting a transport packet in a broadcast system, the sending entity comprising:
    a transceiver; and
    at least one processor coupled to the transceiver,
    wherein the at least one processor is configured to:
    identify service data of a broadcast service and signalling data including information for a transmission delay, the service data including at least one component, generate at least one transport packet including the signalling data, and transmit the at least one transport packet, wherein the signalling data includes maximum buffer size information providing information for a required maximum buffer size of the at least one component, fixed end-to-end delay information providing information for a fixed end-to-end delay between the sending entity and a receiving entity receiving the at least one transport packet, and maximum transmission delay information providing information for maximum transmission delay between the sending entity and the receiving entity, and wherein the fixed end-to-end delay calculated by summing the maximum transmission delay and forward error correction (FEC) protection window time.

12. A receiving entity for receiving a transport packet in a broadcast system, the receiving entity comprising:

a transceiver; and at least one processor coupled to the transceiver, wherein the at least one processor is configured to:

receive a plurality of transport packets from a sending entity via the transceiver, the plurality of transport packets including at least one first transport packet comprising signalling data including information for a transmission delay and at least one second transport packet comprising service data of a broadcast service, the service data including at least one component, obtain the signalling data from the at least one first transport packet, and process the at least one second transport packet based on the signalling data, wherein the signalling data includes maximum buffer size information providing information for a required maximum buffer size for the at least one component, fixed end-to-end delay information providing information for a fixed end-to-end delay between the sending entity and the receiving entity, and maximum transmission delay information providing information for maximum transmission delay between the sending entity and the receiving entity, and wherein the fixed end-to-end delay is calculated by summing the maximum transmission delay and forward error correction (FEC) protection window time.

13. The method of claim 1, wherein the fixed end-to-end delay information is set based on the maximum transmission delay information obtained from delay characteristics determined during an initial setup process and forward error correction (FEC) protection window time.

14. The method of claim 6, wherein the fixed end-to-end delay information is set based on the maximum transmission delay information obtained from delay characteristics determined during an initial setup process and forward error correction (FEC) protection window time.

15. The sending entity of claim 11, wherein the fixed end-to-end delay information is set based on a maximum transmission delay information obtained from delay characteristics determined during an initial setup process and forward error correction (FEC) protection window time.

16. The receiving entity of claim 12, wherein the fixed end-to-end delay information is set based on a maximum transmission delay information obtained from delay characteristics determined during an initial setup process and forward error correction (FEC) protection window time.

* * * * *